United States Patent [19]

Moe

[11] Patent Number: 5,451,857
[45] Date of Patent: Sep. 19, 1995

[54] TEMPERATURE COMPENSATED, REGULATED POWER SUPPLY AND BATTERY CHARGER FOR RAILROAD SIGNAL USE

[75] Inventor: James E. Moe, Circle Pines, Minn.

[73] Assignee: Safetran Systems Corporation, Minneapolis, Minn.

[21] Appl. No.: 945,236

[22] Filed: Sep. 15, 1992

[51] Int. Cl.$^6$ .............................. H02J 7/10
[52] U.S. Cl. ............................................ 320/35
[58] Field of Search ..................... 320/31, 35, 36

[56] References Cited

U.S. PATENT DOCUMENTS

| | | | |
|---|---|---|---|
| 3,564,293 | 2/1971 | Mungenast . | |
| 3,812,415 | 5/1974 | Van Gilder et al. | 320/31 |
| 3,887,858 | 6/1975 | Burkett et al. | 320/31 |
| 3,889,171 | 6/1975 | Hunter, Jr. | 320/31 |
| 3,988,662 | 10/1976 | Hunter | 323/48 |
| 4,207,513 | 6/1980 | Hess, Jr. | 320/23 |
| 4,209,736 | 6/1980 | Reidebach | 320/22 |
| 4,229,687 | 10/1980 | Newman | 320/2 |
| 4,386,308 | 5/1983 | Emile, Jr. et al. . | |
| 4,554,500 | 11/1985 | Sokira | 320/31 |
| 4,600,972 | 7/1986 | Mac Intyre | 362/20 |
| 4,602,204 | 7/1986 | Hase | 320/30 |
| 4,609,861 | 9/1986 | Inaniwa et al. | 320/32 |
| 4,631,471 | 12/1986 | Fouad et al. | 323/306 |
| 4,638,236 | 1/1987 | Carr et al. . | |
| 4,663,580 | 5/1987 | Wortman | 320/35 |
| 4,667,143 | 5/1987 | Cooper et al. | 320/32 |
| 4,686,443 | 8/1987 | Steblay | 320/23 |
| 4,709,202 | 11/1987 | Koenck et al. | 320/43 |
| 4,847,547 | 7/1989 | Eng, Jr. . | |

Primary Examiner—Peter S. Wong
Assistant Examiner—Ed Tso
Attorney, Agent, or Firm—Dorn, McEachran, Jambor & Keating

[57] ABSTRACT

A temperature compensated, regulated power supply and battery charger for supplying power to railroad warning lights and crossing gates utilizes a ferroresonant transformer having a primary winding, a secondary winding, and a resonant circuit in magnetic circuit therewith. Voltage regulation is accomplished at essentially no load conditions by the use of a temperature sensing element and a shunt regulator connected in circuit with the output terminals of the secondary winding. The shunt regulator varies the output voltage at the output terminals in response to temperature sensed by the temperature sensing element during essentially no load conditions.

12 Claims, 2 Drawing Sheets

TEMPERATURE COMPENSATED, REGULATED POWER SUPPLY AND BATTERY CHARGER FOR RAILROAD SIGNAL USE

THE FIELD OF THE INVENTION

The present invention relates to a regulated power supply and battery charger for use in railroad signaling, and more specifically to the supply of power to railroad warning lights and crossing gates. In such a system, primary power for the load—the warning lights and a crossing gate—is from a conventional power company source and batteries are used as standby. However, the batteries must be charged so that they are always in a condition to supply power in the event the conventional power supply is disrupted. Such is absolutely essential in the railroad industry, as at no time may functions such as crossing gates and warning lights be without power.

It is known that the output voltage of a storage battery will vary in accordance with temperature conditions. The optimum float charge voltage will be higher in the winter and somewhat lower in the summer. For optimum results, the battery charger must function in accordance with the prevailing temperature conditions so that the battery is not overcharged in the summer or undercharged in the winter. Thus, temperature compensation is desirable for the battery charger.

Ferroresonant transformers, because of their high reliability, are preferred over other types of regulated chargers for use in battery chargers and regulated power supplies for the described environment. Such devices have an essentially flat output voltage/output current characteristic curve during all but the most lightly loaded conditions. However, such ferroresonant transformers do have a characteristic in which at very low load the voltage increases and it is this characteristic which the present invention utilizes to provide temperature compensation.

An important aspect of the present invention is the ability to switch off the temperature compensation circuit when the presence of a train signals the use of warning lights and the crossing gates. It is necessary to have a constant lamp voltage in the present environment so that lamp illumination is constant and to maximize bulb life.

SUMMARY OF THE INVENTION

The present invention relates to temperature compensated, regulated power supplies for railroad crossing gates and warning lights and particularly to such a circuit which provides temperature compensation for the battery charger during essentially no load conditions.

A primary purpose of the invention is a temperature compensated, regulated power supply utilizing a ferroresonant transformer, a temperature sensing element, and a shunt regulator in circuit therewith to provide voltage regulation, in accordance with temperature, at essentially no load conditions.

Another purpose is a temperature compensated, regulated power supply in which one or more load resistors may be connected across the output terminals of the power supply in accordance with prevailing temperature conditions so that the battery charging voltage is temperature responsive.

Another purpose is a power supply as described in which the temperature compensation circuit is disabled when a signal load is applied to the output terminals.

Another purpose is a simple, reliable temperature compensated battery charger and power supply utilizing a temperature sensing element connected to a shunt regulator which is connected to a regulating winding on the secondary side of a ferroresonant transformer.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention relates to a regulated power supply and battery charger for use with railroad signaling systems such as crossing gates and warning lights. It is essential in that environment that the power supply be reliable and that the standby battery be charged in accordance with prevailing temperature conditions so that the battery is neither undercharged nor overcharged. A ferroresonant transformer is particularly satisfactory for use in such a power supply, as such a transformer provides an essentially flat voltage/current output characteristic curve, thus providing the regulated power supply necessary to operate railroad equipment of this type in a very reliable manner. Such transformers are also highly immune to surge damage which is a substantial problem in a railroad environment.

Although electronic voltage regulators may provide the desired voltage regulation, they are prone to surge damage. The failure mode of an electronic power supply is full on or full off. Thus, the battery is either damaged or it goes dead. If the electronics fail in a ferroresonant regulated power supply, the system will revert to a non-temperature compensated power supply which is acceptable for interim use.

Figure 3:
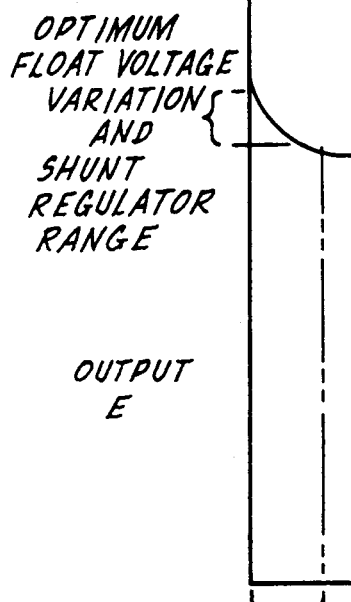
FIG. 3 is an output voltage/output current characteristic curve for a ferroresonant transformer.
Figure 3:
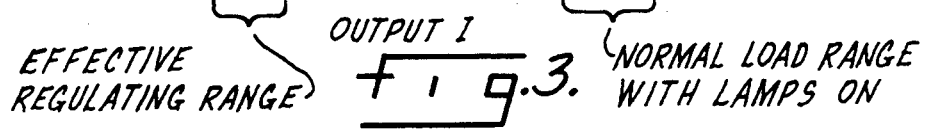

In the environment described the battery which provides standby power is normally charged at no load conditions when neither the crossing gates nor signal lights are operating. Ferroresonant transformers have a characteristic in which at essentially no load, or very light load conditions, there is an increase in output voltage. The present invention utilizes this characteristic of a ferroresonant transformer to provide temperature compensation so that the charge on the battery will be in accordance with prevailing temperature conditions. FIG. 3 shows the characteristic curve of output voltage vs. output current for a ferroresonant power supply and battery charger of the type disclosed herein. It should be noted that during the normal load range, with the lamps or crossing gates on, the output voltage is constant. It should also be noted that for very low load conditions, continuing up to no load, there is an increase in output voltage and it is this portion of the curve during which the battery will be charged and it is this characteristic of a ferroresonant transformer that is used to provide temperature compensation for battery charging purposes.

Figure 1:
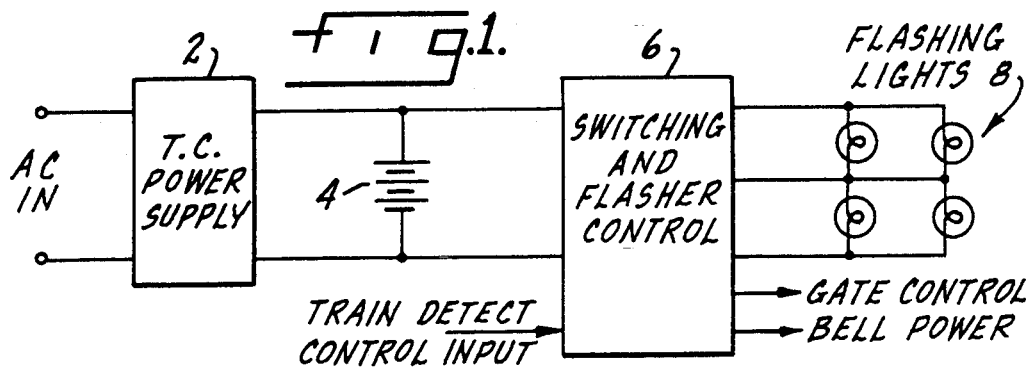
FIG. 1 is a circuit diagram of a railroad warning light control system.

In FIG. 1 the temperature compensated, regulated power supply and battery charger is indicated at 2 and the standby battery is shown at 4. The switching and flasher control 6 is connected to power supply 2 and battery 4 and has a train detection input and outputs for gate control, warning bell power and for the flashing lights 8.

Figure 2:
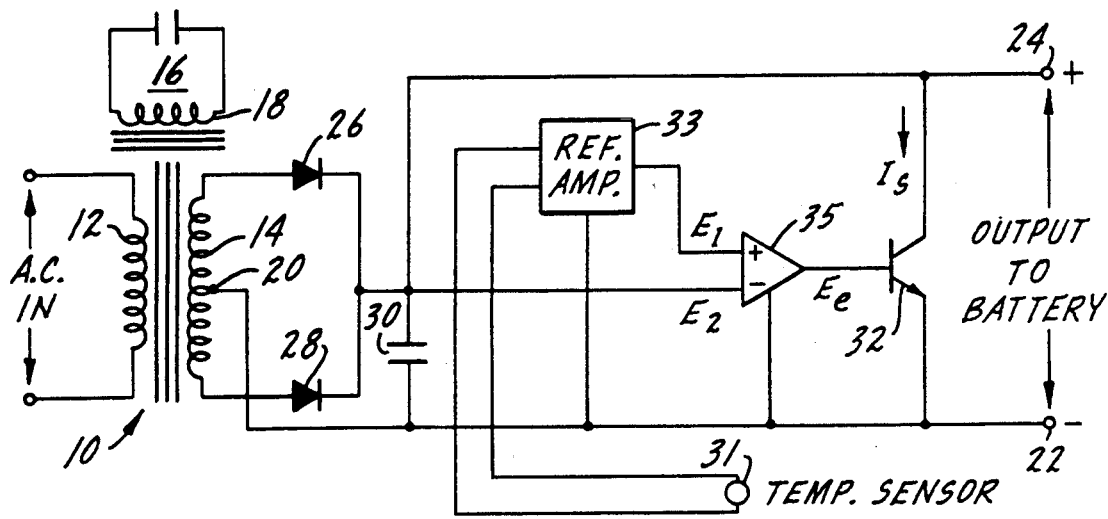
FIG. 2 is a circuit diagram of a first embodiment of temperature compensated regulated power supply.

FIG. 2 illustrates one embodiment of the temperature compensated, regulated power supply and battery charger. A ferroresonant transformer is indicated generally at 10 and has a primary winding 12, a second winding 14, and a resonant tuned circuit 16, the coil of which, indicated at 18, is in magnetic circuit with the primary and secondary windings. One advantage of a ferroresonant transformer for the purpose described is that the resonant circuit excites the output or secondary side of the transformer, and as long as the input frequency is 60 hz, there will be a constant voltage on the secondary side of the transformer. The output voltage from the transformer is generally constant regardless of voltage fluctuations on the primary side of the transformer due to the use of the resonant circuit described.

The secondary 14 has an intermediate tap 20 which is connected to one of the load terminals indicated at 22. The other output terminal 24 is connected through diodes 26 and 28 to the opposite ends of the secondary. A capacitor 30 is connected between the load terminals, as is a shunt regulator in the form of a field effect transistor 32. A temperature sensor 31 provides a temperature representative current to a reference amplifier 33, which provides a reference voltage $E_1$ to an operational amplifier 35. The reference voltage $E_1$ represents the desired output voltage for the prevailing temperature and in practice there will be an essentially linear relationship between temperature from 0°–100° F. and voltage over the range of 12.5 VDC to 14 VDC. The other input $E_2$ to the op amp is the sampled output voltage of the ferroresonant power supply with the op amp output $E_e$ being an error voltage that determines the shunt current $I_s$ through transistor 32.

Based on the characteristic curve of the ferroresonant power supply, open loop voltage at output terminals 22,24 is going to be too high. When the loop is closed through the use of shunt regulator 32, the feedback system will apply sufficient load to bring $E_2$ and the output voltage to equal the reference voltage $E_1$. There will be some difference between $E_2$ and $E_1$, but it will be small if the gain of the overall system is sufficiently high.

Ambient temperature as sensed by the temperature sensor 31 will control the reference amplifier 33 to provide a reference voltage, which when compared with the sampled output voltage from the ferroresonant power supply will control the shunt current which in turn brings the output voltage of the power supply and thus the voltage applied to float charge the battery to the desired level. Under loaded conditions, when the warning lights and/or crossing gates are connected to the load terminals, the temperature compensation device will be disabled, as particularly described in connection with FIG. 4 and the normal flat output voltage portion of the characteristic curve of the ferroresonant transformer will be utilized.

Figure 4:
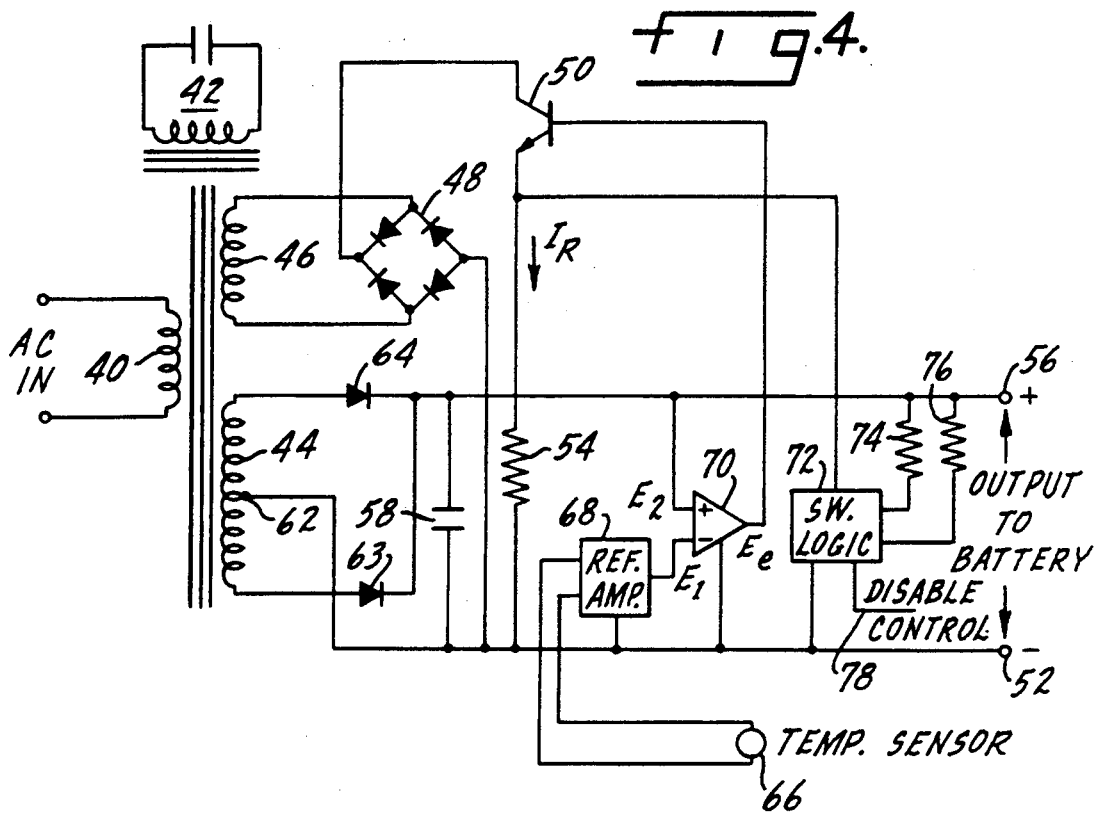
FIG. 4 is a circuit diagram of a second embodiment of temperature compensated regulated power supply and battery charger.

In FIG. 4, a ferroresonant transformer has a primary winding 40, a resonant circuit 42, a secondary winding 44, and a regulating winding 46 which is on the secondary side of the transformer. As was described in connection with FIG. 2, the resonant circuit 42 is in magnetic circuit between the primary and secondary coils of the transformer and is normally effective to provide the characteristic voltage vs. current output curve shown in FIG. 3. The regulating winding 46 is connected to a bridge rectifier 48, one terminal of which is connected to a shunt regulator in the form of a field effect transistor 50. The opposite side of bridge rectifier 48 is connected to load terminal 52. A resistor 54 is in series circuit with field effect transistor 50, to both reduce the dissipation of heat in the shunt regulator and as a safety factor in case there is a short in the shunt regulator. Load terminal 52 is connected to the center tap 62 of secondary winding 44, with load terminal 56 being connected through diodes 63 and 64 to the opposite ends of secondary winding 44. A capacitor 58 is connected between the load terminals. It should be understood that the intermediate tap 62 may be one of a number of different intermediate taps on the secondary so that the power supply may be suitable for use with a variety of different batteries.

A temperature sensor 66, similar to the device described in connection with FIG. 2, is connected to a reference amplifier 68 which provides the reference voltage $E_1$ to op amp 70. The sampled output voltage $E_2$ is the other input to op amp 70 and the output $E_e$, the error voltage, is applied to the base of the shunt regulator 50 to determine the magnitude of the regulating current.

A logic switch 72 is connected between output terminal 52 and the output of the shunt regulator and the magnitude of the current passing through the shunt regulator will control the output of the logic circuit 72 which is effective to connect resistors 74 and 76 across the power supply output providing the temperature compensating load necessary in the described closed loop system. The switching logic circuit may also include a disable control input indicated at 78 which is effective to disable temperature compensation of the output voltage during the period that the power supply has a full load such as the warning lights and crossing gates.

In operation, the error voltage which is the output of operational amplifier 70, is developed in the same manner by the temperature sensor and reference amplifier 68, as described in connection with the FIG. 2 circuit. If voltage $E_2$, representative of the output to the battery, is too high, the operational amplifier output $E_e$ will be negative and shunt current $I_R$ will be zero. This will cause the logic switching circuit 72 to switch in load resistor 74. If $I_R$ is still zero, after adding resistor 74 to the circuit, then the switching logic will first switch in load resistor 76 and finally a combination of resistors 74 and 76 if the sampled output voltage $E_2$ remains high.

When the output voltage $E_2$ is less than the reference voltage $E_1$, $E_e$ is positive and transistor 50 will load the regulating winding, raising the voltage thereof so that the difference between $E_2$ and $E_1$ is near zero.

Figure 5:
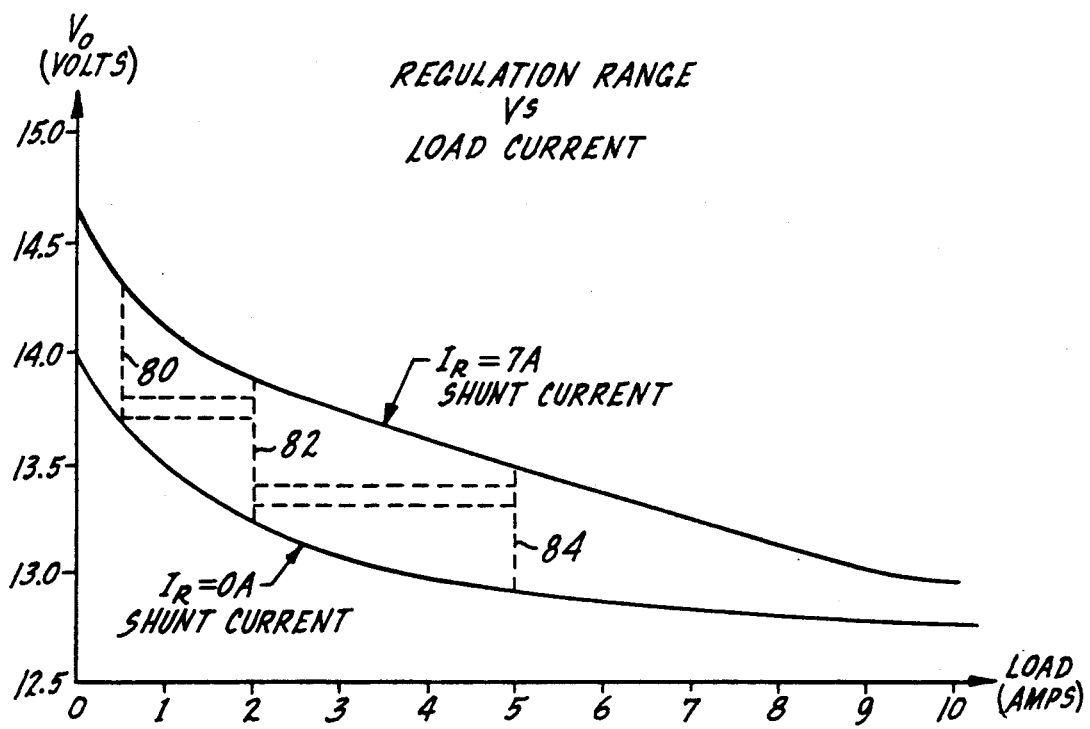
FIG. 5 is a diagram illustrating output voltage vs. output current for the regulated power supply of FIG. 4.

As is known, a battery charger must function so as not to overcharge in summer or undercharge in winter, as normally battery voltage will go high in the winter and will be somewhat lower in the summer. The present invention provides compensation for variations in temperature so that the battery in the railroad environment described will always be charged to an appropriate level. FIG. 5 is an illustration of the use of shunt current to provide temperature compensation and represents that portion of the curve of FIG. 3 which illustrates voltage and current at essentially low load conditions. In FIG. 5, the lowest shunt current $I_R=0A$ and the highest shunt current which the shunt regulator can pass without damage in this case is shown as $I_R=7A$. These values other than the zero value are merely by way of example and should not be limiting. Lines 80, 82 and 84 represent the regulation ranges for different resistive loads. When the current passing through the shunt regulator is essentially at either a zero level, or at the maximum level as determined by temperature, logic control 72 will change the resistive load. Two resistors are shown and this provides a combination of three different resistive loads. The change in resistive load changes the range over which the shunt regulator can function between its upper and lower limits to temperature regulate the output voltage which is used to charge the battery. Depending upon whether temperature is rising or falling, there will be some small difference in the points at which the logic circuit will switch from one range to another. It is desired that the switching point when the temperature is rising or falling not be the same so as to avoid repetitive unnecessary switching between resistive loads due to a very small change in temperature.

Of advantage in the circuit of FIG. 4, as illustrated by the curves of FIG. 5, is that much of the heat dissipated in voltage regulation is through load resistors 74 and 76. Heat dissipation of the solid state shunt regulator 50 is minimized and maximum dissipation occurs at lower temperatures.

Whereas the preferred form of the invention has been shown and described herein, it should be realized that there may be many modifications, substitutions and alterations thereto.

The embodiments of the invention in which an exclusive property are claimed are defined as follows:

1. A temperature compensated, regulated power supply and battery charger for supplying power to railroad warning lights and crossing gates including a ferroresonant transformer having a primary winding, a secondary winding, and a resonant circuit in magnetic circuit therewith, output terminals connected to said secondary winding, a shunt regulator connected across said output terminals and connected to said secondary winding, a temperature sensing element connected to said shunt regulator, said shunt regulator varying the output voltage at said output terminals in response to temperature sensed by said temperature sensing element.

2. The power supply and battery charger of claim 1 further characterized in that said temperature sensor is effective to provide a voltage representative of temperature, a comparison means, one input of which is said temperature sensor voltage, another input for said comparison means represents output voltage, with the output of said comparison means controlling the current of said shunt regulator.

3. The power supply and battery charger of claim 1 further characterized by and including a regulating winding on the secondary side of said ferroresonant transformer, said shunt regulator and temperature sensing element being connected to said regulating winding, one of said output terminals being connected to said regulating winding whereby said shunt regulator regulates the output voltage at said output terminals.

4. The power supply and battery charger of claim 3 further characterized by and including a bridge rectifier connected across said regulating winding, said shunt regulator being connected across said bridge rectifier.

5. A temperature compensated, regulated power supply and battery charger for supplying power to railroad warning lights and crossing gates including a ferroresonant transformer having primary, secondary, resonant circuit and regulating windings, with the regulating winding being on the secondary side of the transformer, output terminals connected to said secondary winding, a temperature sensing element, a shunt regulator connected to said temperature sensing element, said shunt regulator being connected to said regulating winding and connected across said output terminals to provide voltage regulation at said output terminals.

6. The power supply and battery charger of claim 5 further characterized by and including rectifying means connected across said regulating winding, with said shunt regulator being connected across said rectifying means.

7. The power supply and battery charger of claim 6 further characterized by and including a resistor in series circuit with said rectifying means and shunt regulator.

8. The power supply and battery charger of claim 5 further characterized by and including load resistor means connected to said output terminals, and control means responsive to said shunt regulator for controlling the magnitude of said load resistor means whereby said Shunt regulator controls the load across said output terminals which regulates the voltage thereof.

9. The power supply and battery charger of claim 5 further characterized by and including a reference amplifier connected to said temperature sensor and providing an output voltage representative of temperature, an operational amplifier, one input of which is connected to said reference amplifier, a second input of said operational amplifier is connected to said secondary winding to provide a voltage representative of the voltage at said output terminals, the output of said operational amplifier being connected to said shunt regulator to control the current passing therethrough.

10. A temperature compensated, regulated power supply and battery charger for supplying power to railroad warning lights and crossing gates having output terminals, a temperature sensing element and means for varying the output voltage at said output terminals in response to temperature sensed by said temperature sensing element, and means for stopping temperature compensation when there is a crossing gate or lighting load applied to said output terminals whereby said temperature compensated voltage regulation only applies during essentially no load conditions.

11. A temperature compensated, regulated power supply and battery charger for supplying power to railroad warning lights and crossing gates including a ferroresonant transformer having primary, secondary, resonant circuit and regulating windings, with the regulating winding being on the secondary side of the transformer, output terminals connected to said secondary winding, a temperature sensing element and a shunt regulator in circuit with said regulating winding, load resistor means connected to said output terminals, and control means responsive to said shunt regulator for controlling the magnitude of said load resistor means whereby said shunt regulator controls the load across said output terminals which regulates the voltage thereof.

12. The power supply and battery charger of claim 11 further characterized in that said load resistor means includes a plurality of resistors.

* * * * *